(12) United States Patent
Barda et al.

(10) Patent No.: US 9,191,367 B2
(45) Date of Patent: Nov. 17, 2015

(54) PLANT COMMUNICATION NETWORK

(75) Inventors: Ilan Barda, Ra'anana (IL); Rafi Horev, Tel Aviv (IL)

(73) Assignee: RADIFLOW LTD., Tel Aviv (IL)

( * ) Notice: Subject to any disclaimer, the term of this patent is extended or adjusted under 35 U.S.C. 154(b) by 262 days.

(21) Appl. No.: 13/701,505

(22) PCT Filed: May 29, 2011

(86) PCT No.: PCT/IB2011/052348
§ 371 (c)(1),
(2), (4) Date: Dec. 2, 2012

(87) PCT Pub. No.: WO2011/151768
PCT Pub. Date: Dec. 8, 2011

(65) Prior Publication Data
US 2013/0080903 A1 Mar. 28, 2013

Related U.S. Application Data

(60) Provisional application No. 61/350,316, filed on Jun. 1, 2010, provisional application No. 61/350,309, filed on Jun. 1, 2010, provisional application No. 61/350,181, filed on Jun. 1, 2010.

(51) Int. Cl.
*G06F 3/14* (2006.01)
*H04L 29/06* (2006.01)
*G06F 3/0481* (2013.01)

(52) U.S. Cl.
CPC ........ *H04L 63/0245* (2013.01); *G06F 3/04817* (2013.01); *H04L 63/0236* (2013.01); *H04L 63/1416* (2013.01); *H04L 63/1441* (2013.01)

(58) Field of Classification Search
CPC ..................................... G06F 3/14; G06F 3/17
USPC .......... 715/200–277, 700–867; 709/201–229; 705/50–79; 345/30–111; 725/109; 370/254, 331
See application file for complete search history.

(56) References Cited

U.S. PATENT DOCUMENTS

| | | | |
|---|---|---|---|
| 2004/0261116 A1* | 12/2004 | Mckeown et al. | 725/109 |
| 2007/0199061 A1 | 8/2007 | Byres et al. | |
| 2009/0116404 A1* | 5/2009 | Mahop et al. | 370/254 |
| 2010/0054204 A1* | 3/2010 | Dolganow et al. | 370/331 |

FOREIGN PATENT DOCUMENTS

EP 1420317 5/2004

OTHER PUBLICATIONS

International Search Report dated Sep. 9, 2011 for PCT/IB2011/052348; International filing date May 29, 2011; Applicant: RADIFLOW Ltd.
BCIT Group for Advanced Information Technology: "Good Practice Guide on Firewall Deployment for SCADA and Process Control Networks—Policy and Best Practice ID. 00157", National Infrastructure Coordination Centre, UK; Feb. 15, 2005; pp. 1-36.

* cited by examiner

*Primary Examiner* — Ruay Ho
(74) *Attorney, Agent, or Firm* — A.C. Entis-IP Ltd.

(57) ABSTRACT

An embodiment of the disclosure provides a communication network having a plurality of end devices protected by multilayer switches that receive data packets in different formats for transmission to the end devices, translate received data packets to a common data format for inspection to determine if they pose a security threat, and if they do not pose a threat, forward the data packets to their end device destinations.

4 Claims, 3 Drawing Sheets

PLANT COMMUNICATION NETWORK

RELATED APPLICATIONS

The present application is a US National Phase of PCT Application No. PCT/IB2011/052348, filed on May 29, 2011, which claims the benefit under 35 U.S.C. 119(e) of U.S. Provisional Patent Application 61/350,316 filed on Jun. 1, 2010; and U.S. Provisional Patent Application 61/350,309 filed on Jun. 1, 2010; and U.S. Provisional Patent Application 61/350,181 filed on Jun. 1, 2010 the disclosures of which are incorporated herein by reference.

TECHNICAL FIELD

Embodiments of the invention relate to firewalls for protecting industrial automation and control systems.

BACKGROUND

A modern industrial plant is typically a complicated environment comprising an integrated system of automated production equipment, monitoring systems, and computers that control the equipment responsive to data provided by the monitoring systems and human instruction. By way of example, the plant may comprise: production equipment, such as production robots, and chemical reactors; component delivery systems, such as conveyor belts, and pick and place machines; and monitoring systems, such as visual inspection systems and water quality monitors. The various plant components are controlled and monitored in real time to cooperate and automatically perform a production job to which the plant is assigned by signals transmitted over a plant communication network.

Industrial automation control systems and networks were originally programmed with proprietary applications. The proprietary applications didn't interface with standard communication network applications and data processing programs that are the backbone of non-industrial communication networks and data systems that are typically used in the home and in non-manufacturing, hereinafter "enterprise", organizations. As a result, industrial automation and control systems and networks were considered to be relatively immune to any of the various security threats, such as, denial of service attacks, viruses, worms, and unauthorized access, hereinafter referred to generically as "malware", that often compromise software used in the home and enterprise systems.

However, as complexity of automated industrial plants and the control systems that govern them have increased, and the competitiveness of industrial plants has become increasingly dependent on their ability to respond flexibly and rapidly to changing global market conditions, industrial plants have become ever more intimately networked with enterprise network systems that use standard software, such as, Ethernet, TCP/IP, HTTP and Windows. As a result, their data and control systems have become increasingly exposed and sensitive to the same security threats that plague computers and software used in the home and in enterprise systems.

In response to increased exposure to security threats, industrial plants have adopted methods and devices to protect their data and control systems that are similar to methods and devices, such as various configurations of firewalls, which are used to protect home and enterprise communication networks and data systems.

However, malfunctioning of, and/or down time, in a modern automated industrial plant is generally extremely expensive and can carry substantial liability. Manufacturing components and processes in the plant are interdependent, and typically must operate in synchrony. Malware damage to a component of an automated industrial plant can therefore be amplified well beyond any particular damage to the component, and well beyond what might be sustained by an enterprise communication and data system or home computer data system damaged by the same malware.

SUMMARY

An embodiment of the invention relates to providing a multi-service packet switch, which comprises an embedded, application aware engine (AWE) that can be programmed to implement security rules at any of the layers of the Open System Interconnection (OSI) model of an industrial plant communication network to protect the network against security threats. The switch supports Ethernet and serial transmission interfaces, and comprises an industrial protocol aware "translator". The translator recognizes a supported transmission interface and industrial protocol, such as Modbus, Modbus/TCP, Profibus, Profinet, Ethernet/IP, that characterize a format of data packets received by the switch, and converts the received data packets to a common data format responsive to the recognized interface and protocol. Optionally, the common data structure is an Ethernet data format. Data in the common data format is transmitted to the embedded application aware engine (AWE), which processes the data to decide if it presents a security threat. The processing may comprise inspection at any of the OSI layers, any combination of some of the layers, or all the layers. For example, inspection may comprise inspection of the packet headers, as well as their data payloads to characterize a packet by its source and destination addresses and ports, its protocol, and an application that it implements.

If AWE decides that the data packet presents a security threat to the plant operation, the switch blocks further transmission of the packet. If on the other hand AWE decides that the data packet does not present a security threat to the plant, the multi-service packet switch, hereinafter also referred to as an Ethernet "AWE switch", transmits the packet to its intended destination.

In an embodiment of the invention, a plurality of Ethernet AWE switches are used to provide a distributed firewall to protect a communication network that controls and monitors automatic operation of an industrial plant. Each Ethernet AWE switch of the plurality of AWE switches is positioned along an edge of the plant network at an entrance to an "end device" of the network that the switch is intended to protect. An end device is any device in the plant network that contributes to plant operation and is a source or destination of messages transmitted by the network, and may for example, be an industrial robot, a field buss, a sensor, controller or a Human Machine Interface (HMI).

In an embodiment of the invention, an AWE switch is configured with security processing algorithms and data, hereinafter "characterizing data", that characterizes allowed and preferred operation of an end device to which it is connected at a plurality of layers of the network. Optionally, the plurality of layers comprises all the layers. During operation of the plant, the AWE switch operates on data packets it receives using the security algorithms and characterizing data to generate security decisions with respect to the data packets. Since the characterizing data spans all the layers of the network, the AWE switch provides a relatively high resolution, or fine granularity, security filter for the end device.

In an embodiment of the invention, AWE switches that control transmission and routing of data packets between a subset, hereinafter referred to as a "plant activity group (PAG)", of a plant's end devices, which cooperate as a group to perform plant tasks, and generate relatively intense "internal" communication traffic between them using shared industrial communication protocols, are configured to share a commonality of features. A portion of the physical and corresponding logical topology of the plant communication network that services communication for the PAG is referred to as a "PAG-net". The commonality of features, hereinafter referred to as "bus features", define and characterize a "virtual" bus for the PAG-net. The PAG-net bus features comprise, by way of example, recognition and transport of data configured in accordance with a same industrial protocol, and/or application of a same set of communication traffic handling algorithms, and/or security rules that apply to all traffic on the PAG-net independent of direction of the traffic in the PAG-net.

According to an aspect of some embodiments of the invention, an AWE switch is configured to determine if data transmitted over the plant communication network that it receives is intended to program the AWE switch. If it determines that programming is indicated, the AWE switch, changes from a normal operating mode to a programming mode. In the programming mode, normal procedures that govern switch operation are changed to enable programming. Optionally, during programming all normal operating procedures of the switch are held in abeyance. In some embodiments of the invention, the switch performs a portion of its normal operating procedures that are not affected by the programming.

To provide convenient programming of the distributed firewall, in accordance with an embodiment of the invention, an optionally double layer graphic user interface (GUI) is provided. A first GUI layer comprises an image that represents a physical topology of the plant network communication channels and end devices connected by the channels. A second GUI layer comprises an image representing a logical topology of the plant communication network. The GUI physical layer and GUI logical layer can be superposed, for example as semitransparent images, or presented as two layers one over the other in a perspective view so that both GUI layers are viewed simultaneously to facilitate viewing and understanding structure of the plant network and its PAG-nets.

In an embodiment of the invention, to facilitate maintenance and programming of AWE switches in accordance with an embodiment of the invention, the GUI interface is configured to enable a user to select a PAG-net from among PAG-nets of the plant communication network and display the physical and/or logical topology of the selected PAG-net. Optionally, the user selects a PAG-net by selecting an end device in the PAG or by selecting a PAG-net bus shown in the logical topology plane of the GUI. The user is then able to directly program individual AWE switches and their firewalls responsive to the common features of the PAG-net, such as its shared industrial protocols and/or tasks that the PAG's end devices cooperate to perform. The user, of course, may also establish general security rules that apply to the PAG-net and implement them by inputting the rules to a network management system (NMS) which then programs individual AWE switches responsive to the rules.

In the discussion unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1:
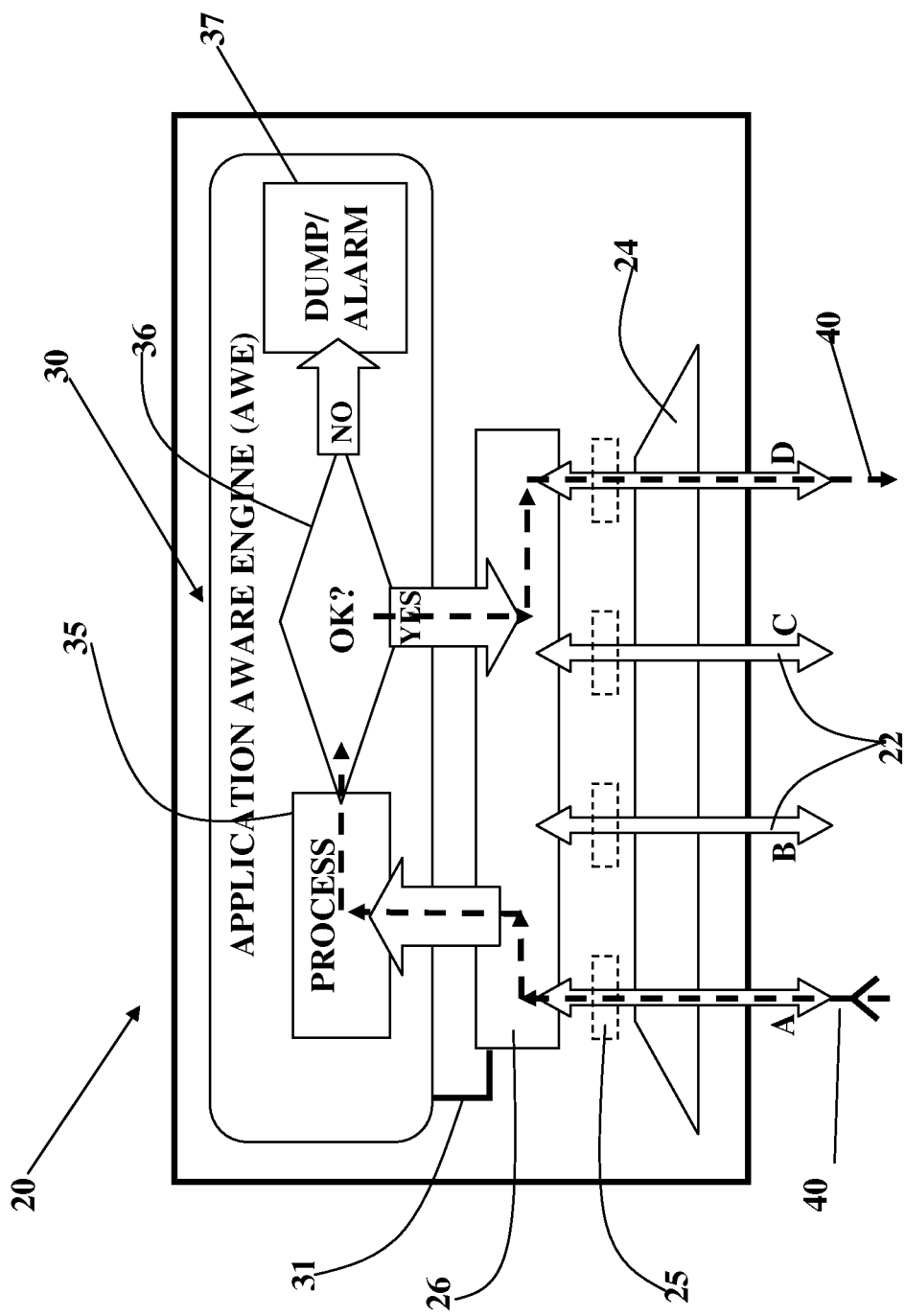
FIG. 1 schematically shows an Ethernet AWE switch, in accordance with an embodiment of the invention.

FIG. 1 schematically shows an AWE multi-service packet switch 20 in accordance with an embodiment of the invention. AWE switch 20 optionally comprises a plurality of communication ports, represented by double arrowhead block arrows 22, through which communication signals are received and transmitted by the switch, a format translator 24, a transmission director 26, and an embedded application aware engine (AWE) 30. Communication ports 22 are individualized by alphabetic labels, A, B, C and D. AWE switch 20 is assumed to be a component of a plant communication network that comprises end devices and other AWE switches, and is schematically shown processing a communication signal represented by a dashed arrow head line 40.

Switch 20 supports Ethernet as well as serial data transmission protocols such as RS-232 and RS-485 serial protocols, which are typically used by legacy plant equipment for control and communication, and ports 22 are configured to receive and transmit data transmissions from and to the supported interfaces.

Format translator 24 recognizes a transmission interface, such as Ethernet, RS-232, or RS-485, and an industrial protocol, such as by way of example Modbus, Modbus/TCP, Profibus, Profinet, Ethernet/IP and Foundation Fieldbus HSE, which characterize a data format of packets entering AWE switch 20. Responsive to the recognized interface and protocol, the AWE switch reformats the packets into a common data format, which is used internally in the switch for processing data. The format translator also operates to convert data that is to exit the switch and propagate to an intended end device from the common data format to a data format that is accepted by the end device.

For example, assume that data incoming to switch 20 is formatted according to a serial RS-232 interface and a ModBus protocol. Format translator 24 reformats the RS-232 ModBus data into the common data format for internal processing and security inspection by AWE switch 20. Following processing, assuming that the processed data does not represent a security threat, and is to be transmitted optionally to an intended RS-485, ModBus end device, the format translator converts the data to an RS-485 ModBus, format for transmission to the end device. In an embodiment of the invention, the common data structure is an Ethernet data structure.

Transmission director 26 comprises a wire speed packet switch and operates to direct communication traffic in the switch and transmit incoming and outgoing data packets to required destinations.

AWE 30 is programmable with data and algorithms to provide a firewall, schematically represented by a dotted rectangle 25, for each port 22 that is tailored to security requirements of end devices connected to the port. To build a firewall for a particular port, the inspection engine is programmed with data, i.e. characteristic data, that characterizes the end devices connected to the port and security algorithms appropriate for processing data packets entering the port responsive to the characteristic data. In accordance with an embodiment of the invention, AWE switch 20 operates on communication signals at any, and/or a plurality of, optionally all, levels of OSI, responsive to characteristic data for a given end device using associated algorithms that may be relevant to any and all OSI levels. Optionally, AWE 30 performs inspection of packet content at OSI layer 7 on packets it receives. Firewalls 25 for different ports 22 may be different from each other and programmed with different characteristic data and security algorithms.

It is noted in the above discussion that inspections and security decisions are described as being undertaken by AWE 30. However, optionally, some inspection tasks, such as relatively straightforward inspections of source and destination addresses of a packet are optionally undertaken by transmission director 26. In some embodiments of the invention, AWE 30 is configured to autonomously transfer, optionally via an internal communication channel 31, inspection tasks, such as inspecting addresses and/or monitoring bandwidth use of communication to a given end device, to the transmission director 26.

Operation of AWE switch 20 in accordance with an embodiment of the invention is elucidated by following progress of a communication signal 40 through the switch.

Signal 40 enters switch 20 optionally via port 22 labeled A. Assuming that communication signal 40 is configured according to an Ethernet ProfiNet protocol data format, the incoming signal is translated by format translator 24 optionally into an Ethernet data format that preserves the data in the ProfiNet protocol. Following translation, source and destination addresses of data signal 40 are optionally checked by traffic director 26, and the traffic director forwards the signal to application aware engine 30, i.e. AWE 30. In AWE 30 the signal is processed optionally in accordance with a process schematically represented by process steps 35, 36 and 37.

In process step 35 AWE 30 processes signal 40 to generate signal security data indicative of whether or not the signal represents a security threat to an end device for which the signal is intended. In process step 36 AWE 30 determines, responsive to the signal security data, if data signal 40 does not involve a security threat and is "OK" or the signal does in fact represent a security threat and is not OK. If the signal is OK it is optionally transmitted from AWE 30 to communication director 26 for forwarding from Ethernet AWE switch 20 to its intended end device. If on the other hand, the signal is determined not to be OK, the signal is dumped in process step 37. Optionally, in process step 37 AWE 30 generates a security alarm, which AWE switch 20 transmits to other AWE switches and/or end devices, such as a network management system (NMS) and/or an HMI, in the plant network of which it is a component to alert them to the security threat and to initiate protective action.

In an embodiment of the invention an AWE switch, such as AWE switch 20, is configured to send security alarms to an NMS and/or an HMI in response to "sentinel" signals. Sentinel signals are normally benign signals, which by themselves do not necessarily indicate a threat, but if their temporal and/or spatial occurrence in a communication network is statistically aberrant can indicate a security breach.

For example, a network might be configured to allow reprogramming of a limited number of end devices within a given period of time. Reprogramming signals, legitimate by themselves, if they are transmitted to reprogram a number of end devices per unit time in excess of the allowed number might be indicative of a security threat. In an embodiment of the invention, an NMS comprised in a network having a plurality of AWE switches configured to transmit sentinel signal alerts, processes sentinel signals it receives from the AWE switches to determine if the temporal or spatial occurrence of the sentinel signals represents a security threat to the network that warrants defensive action. In an embodiment of the invention, an HMI comprised in a network having a plurality of AWE switches configured to transmit sentinel signal alerts, processes sentinel signals it receives from the AWE switches to determine if the temporal or spatial occurrence of the sentinel signals represents a security threat to the network that warrants generating an alert to a human operator.

By way of example, in FIG. 1 data signal 40 is determined to be OK, and is therefore forwarded to transmission director 26 for transmission from the switch to an end device (not shown in FIG. 1) connected to port D. The end device connected to port D is assumed for purposes of presentation, to be a legacy serial RS-485 ProfiBus robot. Prior to transmission to the RS-485 robot, signal 40 is converted from the Ethernet data format, to the ProfiBus RS-485 data format.

Figure 2A:
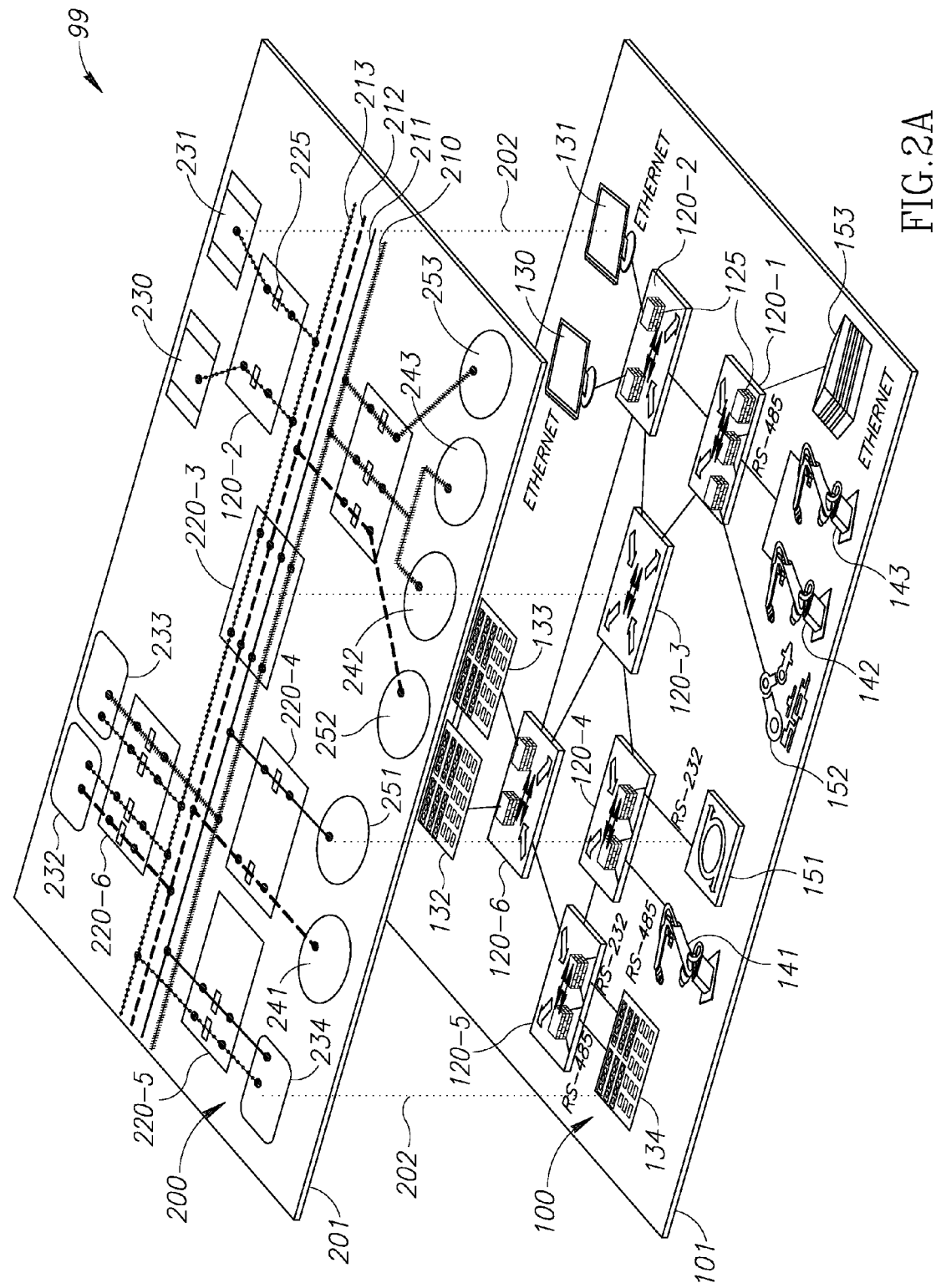
FIG. 2A schematically show physical and logical topologies of an industrial plant network protected by a distributed firewall comprising Ethernet AWE switches, in accordance with an embodiment of the invention.

FIG. 2A schematically shows physical and logical topologies 100 and 200 respectively of an exemplary plant communication network comprising AWE switches 20, in accordance with an embodiment of the invention.

Physical and logical topologies 100 and 200 are shown respectively on bottom and top planes 101 and 201, which are shown in a perspective GUI format 99, in accordance with an embodiment of the invention. The physical and logical topologies are registered to each other and substantially homologous, so that icons in logical topology 200 that represent physical entities in physical topology 100 project onto the physical entities. Correspondence between icons in logical topology 200 and entities in physical topology 100 that they represent are indicated by vertical "projection lines" 202 that extend from the icons to their corresponding physical entities, and are shown for some of the icons and corresponding entities.

By way of example, the plant network comprises 6 AWE switches 120-1, 120-2 ... 120-6, which are shown in physical topology 100, are similar to AWE switch 20 shown in FIG. 1, and connect a plurality of end devices in the plant network shown in the physical topology. The end devices optionally comprise an operations human machine interface (HMI) computer 130, an engineering station 131, main controllers 132 and 133, a local controller 134, and field devices. The field devices optionally comprise robots 141, 142, and 143 that transmit and receive data configured according to an RS-485 serial protocol, a motor 151 and a robot 152 that communicate using an RS-232 serial protocol, and a remote terminal unit 153 that communicates via Ethernet. The end devices are protected by AWE switch fire walls 125.

In accordance with an embodiment of the invention, each AWE switch 120-1, 120-2 . . . 120-6 is programmable to provide a different, uniquely configured firewall 125 operable to provide inspection and protection at all OSI layers for each of its communication ports 22 (FIG. 1) responsive to security needs of end devices connected to the ports. The ability to "personalize" multilayer firewalls to each port and end device connected to the port enables the AWE switch to provide firewalls characterized by relatively high granularity security for the end device connected to the AWE switch.

For example, RS-232 robot 152 and RS-485 robots 142 and 143 shown in physical topology 100 are protected by firewalls 125 in AWE switch 120-1. Assume that robot 152 operates at a slower rate than robots 142 and 143. The firewalls protecting the robots may be personalized by programming the AWE switch 120-1 to monitor action instructions communicated to the robots and determine a security risk for robot 152 if action instructions are transmitted to the robot at a rate exceeding a first threshold, and to determine a security risk for robots 142 and 143 if actions instructions are sent to the robots at a rate exceeding a second threshold greater than the first threshold.

By way of another example, assume robot 141 which is connected to AWE switch 120-4, performs a task responsive to action instructions that are transmitted to the robot in a particular sequence. In accordance with an embodiment of the invention, AWE switch 120-4 is configured to provide a firewall 125 for the robot that prevents transmission of instructions to the robot that are received out of sequence. To implement the firewall, data contents of packets received by AWE switch 120-4 that are addressed to robot 141 are inspected by application aware engine, AWE 130 (FIG. 1), to determine sequences of action instructions transmitted to the robot. If a sequence is out of order, AWE switch 120-4 determines the packets represent a security risk and prevents their transmission to the robot.

By way of yet another example, assume that both human machine interface HMI 130 and engineering station 131 enable writing to controller 132, but that HMI 130 is intended to be limited to writing only to data registers in the controller while engineering station 131 is intended to enable writing to both data registers and program logic registers in the controller. Switch 120-6 inspects packets received from 130 and 131 that are addressed to controller 132 to determine if they comprise write commands, and allows write commands to the controller only from engineering station 131.

Icons in logical topology 200 representing end devices shown in physical topology 100 are labeled with numerals having digits identical to the numerals labeling devices they respectively represent, except for the most significant digit, which is "2" rather than "1". Whereas logical topology 200 reflects physical topology 100, and comprises icons representing components of the physical topology, the logical topology in many instances exhibits features and relationships between the physical components, such as virtual buses 210, 211, 212 and 213 shown in logical topology 200, that are not necessarily obvious from the physical topology.

A virtual bus emerges for a subset of end devices in a plant network that cooperate to perform plant tasks and communicate among themselves relatively frequently compared to a frequency with which members of the subset communicate with end devices in the plant network that are not in the subset. As noted above, the subset is referred to as a plant activity group, i.e. a PAG, and that portion of the plant network that they use to communicate among themselves is referred to as a PAG-net. The PAG-net generally comprises a virtual bus that is defined by the end devices in the PAG and industrial protocols that the end devices use to communicate with each other. AWE switches 120-1 . . . 120-6, and their respective firewalls 125, shown in physical topology 100 are configured to implement routing and security rules for PAG-nets to which they belong responsive to the industrial protocols that define the PAG-net buses and security constraints of buses and the end devices.

In FIG. 2A the plant network defined by physical and logical topologies 100 and 200 comprises, by way of example, four PAGs, each comprising a different one of the four virtual buses 210, 211, 212 and 213. Each virtual bus is distinguished by a different style line. End devices belonging to a same PAG-net comprising a given virtual bus, are connected to components, such as AWE switches and/or other end devices in the PAG-net, by communication channels represented by lines having the same style as the virtual bus. It is noted that whereas each of the PAG-nets comprised in the plant network characterized by physical and logical topologies 100 and 200, and PAG-nets, in accordance with an embodiment of the invention, are not limited to a single virtual bus. For example, a PAG-net may comprise a first group of end devices that communicate via a first bus using a first protocol and a second group of end devices that communicate via a second bus using a second protocol.

A PAG-net in a plant communication network, in accordance with an embodiment of the invention, is optionally defined by an operator of the plant network. Once the PAG is defined, the AWE switches monitor traffic patterns in the PAG and automatically generate security rules for the PAG that are provided to a suitable network manager for vetting and approval.

In some embodiments of the invention, PAG-nets in the plant are defined and/or updated responsive to "connectivity models" generated autonomously by AWE switches in the plant network. The AWE switches monitor traffic intensities, directions, and industrial protocols to determine end devices that cooperate in performing plant tasks to generate connectivity models that are candidates for defining PAG-nets and their associated virtual buses. The connectivity models are optionally provided to a network management system for vetting to determine whether they qualify as PAG-nets.

In accordance with an embodiment of the invention, to aid a person configuring an AWE switch 120-1, 120-2 . . . , or 120-6, the person can view in isolation a PAG-net for which the AWE switch is relevant, by selecting in logical topology 200 the PAG net's bus 210, 211, 212, or 213, or an end device in the PAG. Upon selection, the physical and logical topologies of the PAG-net are shown in isolation from other components of the plant network.

Figure 2B:
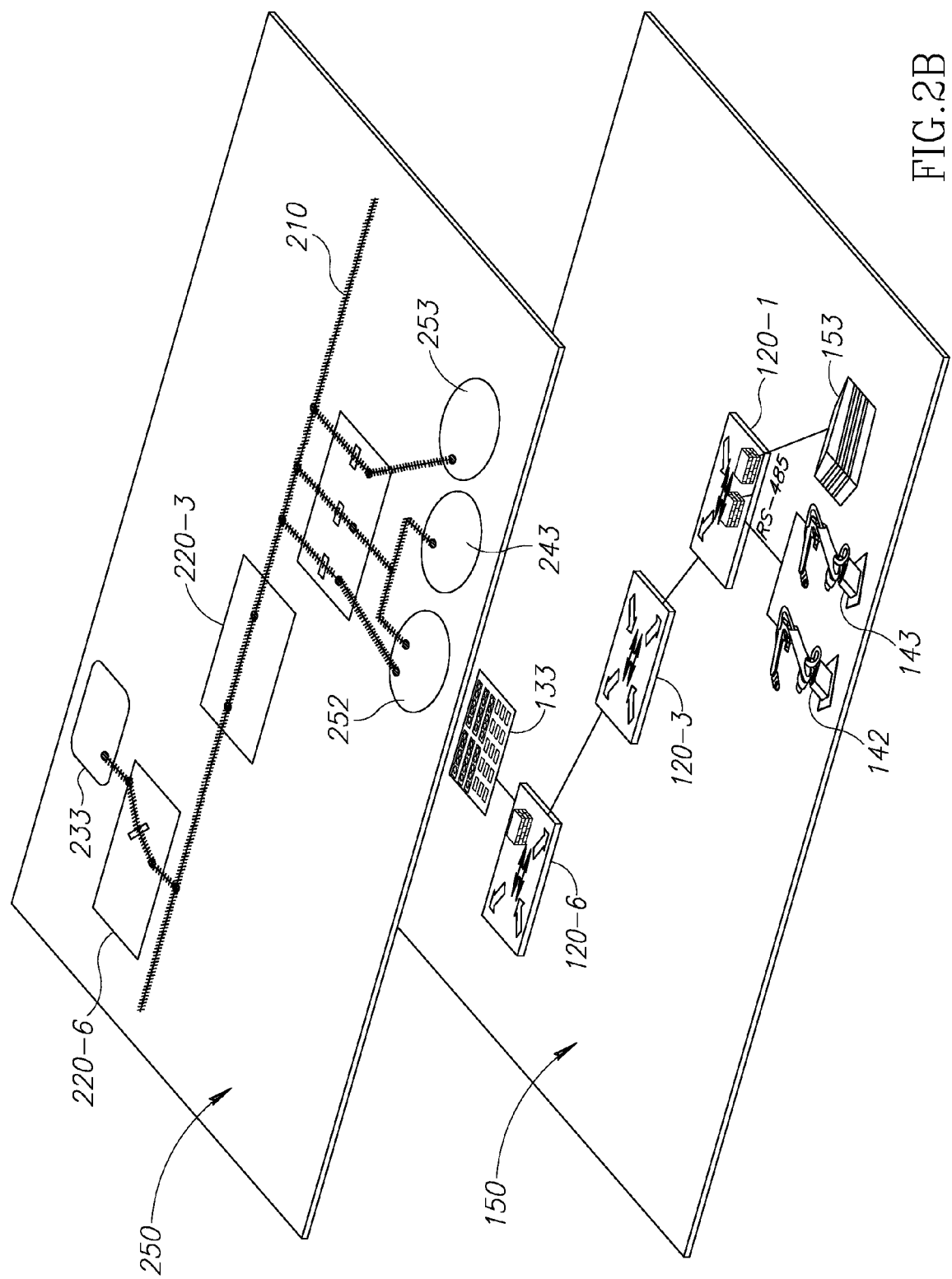
FIG. 2B schematically shows physical and logical topologies of a PAG-net comprised in the industrial plant network shown in FIG. 2A, in accordance with an embodiment of the invention.

FIG. 2B shows a physical topology 150 and corresponding logical topology 250 for a PAG-net selected from physical and logical topologies 100 and 200 by selecting bus 210. Logical topology 250 clearly shows relationships between bus 210 and end devices in the PAG-net that are coupled to the bus. Reference to physical topology 150 exhibits the physical reality of the PAG end devices and their connections that underlie the logical topology. Reference to logical and physical topologies 250 and 150 facilitate programming AWE switches 120-1 . . . 120-6 in response to features of the PAG-net bus bar 210 that determine overall operation and security concerns of the PAG-net and particular communication requirements and security needs of individual end devices.

In accordance with an embodiment of the invention, programming an AWE switch 120-1 . . . 120-5 or 120-6, is performed in real time during operation of the PAG-net. Application aware engines 30 in the AWE switches are configured to inspect content of packets that they receive to determine if they comprise programming data for the switches. When an AWE 30 determines that a packet it receives is intended to program the AWE switch to which it belongs, it initiates a "programming pause" command that disables those functions of its AWE switch, and optionally functions of other AWE switches in the PAG-net comprising the switch or the larger plant network comprising the PAG-net, that might interfere with, or be compromised, by reprogramming. Optionally, it does not disable other functions of the PAG-net or plant network. When reprogramming is completed, an "end programming pause" command is issued, optionally by the AWE switch that initiated the programming pause, to renew normal operation of the PAG-net and/or plant network.

In some embodiments of the invention, an AWE switch 120-1, . . . and/or 120-6 is configured to autonomously initiate a programming pause. For example, when a new end device is connected to the AWE switch, the switch optionally initiates a programming pause to configure a fire wall 125 for the end device, responsive to communication features of the PAG-net comprising the switch.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A graphical user interface (GUI) for managing a plant communication network comprising a plurality of end devices, the GUI comprising:
 a first planar graphical image in perspective of a physical topology of the network schematically showing physical entities comprised in the network;
 a second planar graphical image in perspective of a logical topology of the network in which physical entities of the network are represented by icons;
wherein:
 the first and second planar graphical images are arranged so that the icons in the logical topology appear to project onto the physical entities in the physical topology that they respectively represent; and
 the second planar graphical image distinguishes:
  a subset of end devices of the plurality of end devices comprised in the network which cooperate and communicate with each other as a group to perform plant tasks as a plant activity group; and
  a virtual bus for the plant activity group, which virtual bus is characterized by routing and security rules that control communication between the devices in the subset of end devices.

2. The GUI according to claim 1, wherein the first and second planar graphical images are superposed.

3. The GUI according to claim 2, wherein first planar graphical image, the second planar graphical image or both are semitransparent images.

4. The GUI according to claim 1, wherein the first and second planar graphical images are displayed one over the other in a perspective view.

\* \* \* \* \*